Sept. 7, 1965 F. SCHMITTHENNER 3,205,307

CIRCUIT FOR INTERCOMMUNICATION SYSTEMS

Filed Oct. 19, 1961 2 Sheets-Sheet 1

INVENTOR

FRED SCHMITTHENNER

Fred Schmitthenner.

BY

ATTORNEY

CIRCUIT FOR INTERCOMMUNICATION SYSTEMS

Filed Oct. 19, 1961 2 Sheets-Sheet 2

INVENTOR
FRED SCHMITTHENNER
Fred Schmitthenner
BY
ATTORNEY

United States Patent Office 3,205,307
Patented Sept. 7, 1965

3,205,307

CIRCUIT FOR INTERCOMMUNICATION SYSTEMS

Fred Schmitthenner, P.O. Box 364, Hollywood, Calif.

Filed Oct. 19, 1961, Ser. No. 146,293
4 Claims. (Cl. 179—1)

Figure 1:
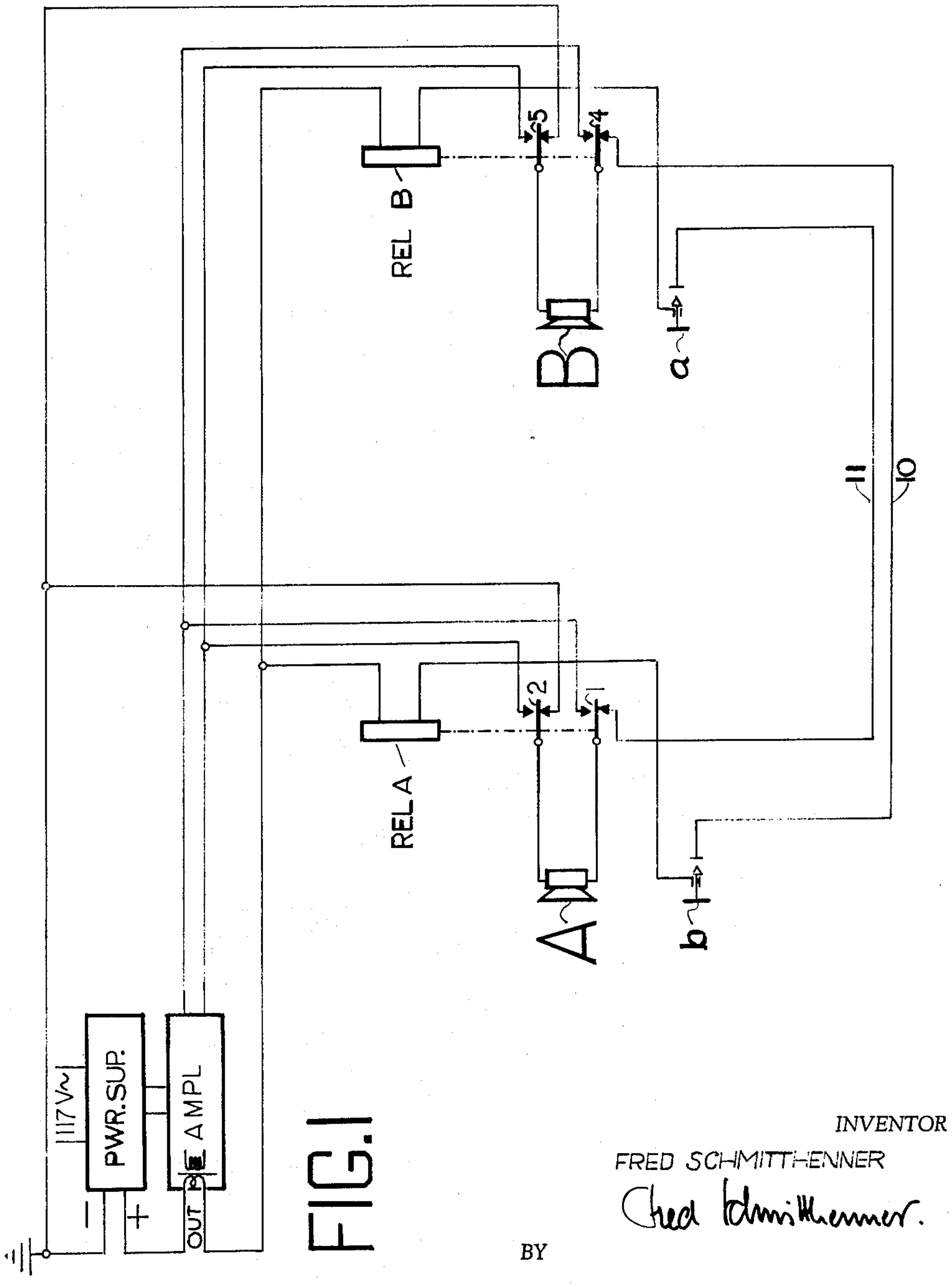
Figure 2:
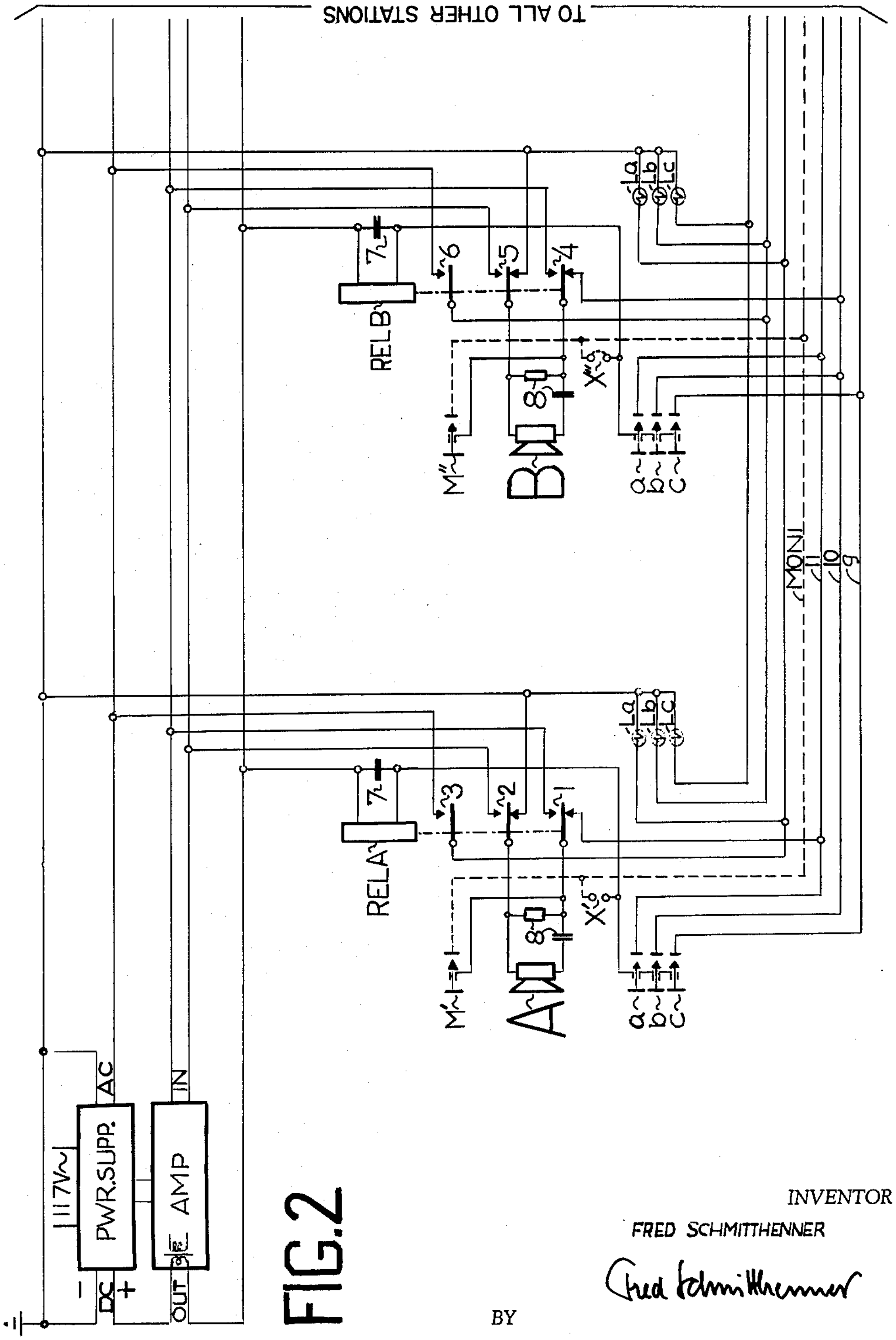

This specific invention relates to intercommunication systems of the loudspeaking type and in particular to those used in residential, commercial and military installations for quality performance and privacy in communication.

Common to these systems, at the present state of the art, is the use of manually operated multiple contact selector switches, or separate single contact selector switches operated in conjunction with multiple contact "talk-listen" switches, or the use of a quantity of common relays in addition to relays at each station, in order to achieve the required performance.

Typical major drawbacks in these systems are the inconvenience in their manual operation, or the accidental switching of amplifiers against each other, or the time consuming staggered wiring on installation, or the requirement of separate power supplies (e.g., connection to a 117 v. line) at each station, or the excessive cost of equipment, or, as in most cases, the large physical size of a desk or wall station necessary to accommodate the associated equipment.

The present invention intends to overcome these shortcomings with a new approach to the basic circuitry.

The new circuit utilizes only one single pole switch, instead of the usual multiple contact selector and "talk-listen" switches, to close a selective communication circuit from one station to another, and only one relay per station, instead of a quantity of individual and common relays, to perform the necessary simultaneous switching of all auxiliary circuits, including annunciator lights, busy signals, monitoring or priority circuits.

The new circuit permits the design of sophisticated, all-master, all-private intercommunication systems at low cost, as well as the development of small, compact, attractive, and easily operated master panels. The previously mentioned single contact switch may be of the miniature, lighted pushbutton type, while amplifiers, power supply and relays may be mounted together at a central location and may be energized by a common low voltage bell transformer.

The new circuit permits system installation without staggered wiring and complicated wiring diagrams. It also assures against accidental switching of amplifiers against each other, which produces, as it is common in existing multiple amplifier systems, the very disturbing squeal of double amplification. The circuit may be also employed in one-amplifier systems, or systems of full privacy, or systems with monitoring and PA facilities, or systems with an all-master or master-remote station arrangement.

The new circuit and its advantages for the design of modern intercommunication systems becomes more apparent with the following description and the accompanying drawings in which:

FIGURE I is a simplified diagram of the basic circuit for quick reference, and

FIGURE II is a more complete schematic of an operative 2-and-more-station system.

FIGURE I

Two stations, A and B, and a central amplifier/power supply are connected for a two-way conversation. Station A, for example, may originate a call to B by depressing contact *b*. A D.C. circuit, originating at the power supply, is closed: (+), OUT, REL A, contact *b*, connecting wire 10, contact 4, speaker B, contact 5, back to (—) power supply. The now energized relay REL A switches with its contacts 1 and 2 both connections of speaker A to the input IN of amplifier AMP. An audio signal originating in speaker A (now a microphone) is consequently amplified and superimposed within the output transformer of the amplifier upon the previously described D.C. circuit, over which it rides to speaker B for reproduction. Station B answers the call by depressing contact *a*. A circuit similar to that described above is now closed for a communication from B to A: REL B is energized, speaker B becomes a microphone and speaker A a reproducer. The relay operation assures against any confusion in the alternate origination of calls: relay REL A will not function until B has terminated and relay REL B will not function until A has terminated.

In short, a D.C. power supply, an amplifier output-transformer, the coil of a relay, a single pole contact and a remotely located speaker are connected in series, transmitting an audio signal from one location to another and simultaneously switching with the relay contacts all associated circuits.

FIGURE II

The simplified circuit of FIGURE I is redrawn in this figure and extended with details necessary for the practical operation of a multiple station system. Two stations, A and B, are shown with their connections to the next station. More selector contacts similar to *a* and *b* are added and interconnecting wires supplemented. Each station is also raised to the category of a master station, capable of operating the entire system.

Since it is essential in a selectively operated multiple station system to indicate the origin of a call, the duration of a call and the general occupancy of the system, indicator lights L*a*, L*b*, etc., are added. These lamps are intended to be located near or within the selector switches *a*, *b*, etc., to which they correspond (e.g., lighted pushbutton switches). The lamps are operated by an additional contact on the station relay. These contacts, designated 3, 6, etc., close the corresponding lamp circuit, which originates at the A.C. side of the power supply and returns through its group of lamps to ground. Consequently, if A originates a call to another station, REL A becomes energized, contact 3 at this relay closes, and all A lamps in the system light up, indicating that A is operative with an outgoing call. Simultaneously the voice of A, as described above, appears at the selected station, e.g. station B. This station, with lamp L*a* on, has an indication of where it is receiving a call and which button to press to return the call. On returning the call, all B lights in the system go on, indicating that B is operative with an outgoing call. Both L*a* and L*b* lights thus intermittently appearing on all stations indicate to other users the occupancy or "busy" situation in the system.

It is obvious that stations not participating in the described communication remain undisturbed and also have no means for "listen-in" (full privacy feature). They can, however, in case of emergency, communicate with a busy station by depressing the corresponding switch and purposely override the conversation in progress (priority feature). For intentional "listen-in" (dictating, industrial surveillance or baby-sitting) the circuit provides two ways: originated monitoring or remote monitoring.

In the case of originated monitoring, the switches *a*, *b*, etc., are of the lock-in type. Switch *b*, for instance, locked in at station A, will make speaker A an "open" microphone and direct sound to station B, where it is reproduced (dictating, etc.). In the case of remote monitoring, one or several common monitoring lines, designated MONI (dotted lines), monitoring switches, designated M', M", etc., and connecting bridges X', X", etc., are added to the system. Should, for instance, station B for a period of time be remotely monitored by other stations, bridge X'' at station B is closed. By depressing monitor switch M' at station A, the following D.C. audio circuit, originating at the power supply, is closed: (+), OUT, REL B, bridge X'', connecting wire MONI, contact M', speaker A, contact 2, back to (−) power supply. The energized relay REL B switches speaker B to input and the amplified sound originating at B will reach speaker A for reproduction. Other stations connected to the common monitor line and provided with contacts M can also monitor B remotely. A station engaged in monitoring another will not become inoperative for incoming or outgoing calls: An incoming call will override the monitored signal, while by originating an outgoing call to a third station, the station relay will temporarily interrupt the monitor circuit and reinstate it after the termination of the outgoing call.

Filters 7 and 8 at each station provide necessary bypasses for audio frequencies or D.C. portions, respectively. The central power supply may be a low voltage bell transformer supplying direct A.C. for the lamp circuits and, after rectification, D.C. for the relay circuits and eventually transistorized amplifier.

The double wiring and switching of all input connections assures against inductive feedback and ground loops, respectively. The disconnection of all speakers from the output of an amplifier during idle periods provides a system of complete silence. The now possible connection of all switch circuits *a*, *b*, etc., and lamp circuits L*a*, L*b*, etc., in parallel to an interstation connecting cable eliminates complicated staggered wiring, commonly observed in multiple station intercom systems. For small systems with one central amplifier and stations located at short distance (homes, offices), an interconnecting cable common to all components including the amplifier/power supply is used; for larger one-amplifier systems or an installation extended over a larger area (industrial plants), the two input connections of each station are separated from the cable and run directly to the amplifier location (1 pair "home-runs"); in multiple amplifier systems the two input lines, the output line of the amplifier, the lamp supply line and the common ground wire are run directly to the respective amplifier/power supply location ("home-runs" of 5 conductors: 2 shielded, 2 unshielded, 1 drain wire), leaving for the system's common interconnecting cable only one call—and one lamp—wire per station.

Whereas the invention has been described with respect to one configuration thereof, which in even large installations has given satisfactory results, it is understood that many modifications, omissions and refinements can be made without departing from the true spirit and scope of this invention. For example: 2 selector switches *a* and *b* can be combined in one 2-position momentary contact switch for even more compact design of multiple circuit master panels; or a selector switch may be combined with a monitor switch in one 2-position switch for a remote controlled 2-way comunication; or contact 3, 6, etc., at the respective relays may be shunted to provide dimmed lights for permanent lamp testing or legend reading at night; or call-lines 9, 10, 11, etc. can be paralleled by means of a separate multiple contact relay for "all-call" or "all-monitoring" purposes.

What I claim as new and desire to secure by Letters Patent of the United States is:

1. An electrical intercommunication system comprising:

(a) at least three independent stations each having an acoustic transducer adapted to serve both as a microphone and as a speaker, (b) a power source and an amplifier common to a plurality of said stations, said amplifier having a normally disconnected input and a normally disconnected output, said power source providing direct current, (c) a switching device, (d) first manual station selector means for selectively manually connecting the transducer at one of said stations in series circuit with said power source, said output and said switching device to thereby apply said direct current to said switching device to actuate said switching device, and (e) second means responsive to energization of said switching device upon application thereto of said direct current to connect the transducer at one of the other of said stations to the input of said amplifier.

2. The system defined in claim 1 including an additional manual selector means at a different station connected in parallel with said first manual selector means.

3. The system defined in claim 1 wherein said switching device is an electromagnetic device.

4. The system defined in claim 1 wherein each of said stations has both said first and second means.

References Cited by the Examiner

UNITED STATES PATENTS

| | | | |
|---|---|---|---|
| 2,044,305 | 6/36 | Johnson | 179—1 |
| 2,381,174 | 8/45 | Massa | 179—1 |
| 2,387,443 | 10/45 | Hasenberg | 179—1 |
| 2,855,461 | 10/58 | Bernstein | 179—1 |

ROBERT H. ROSE, *Primary Examiner.*

THOMAS B. HABECKER, *Examiner.*